United States Patent [19]
Makow

[11] 3,724,781
[45] Apr. 3, 1973

[54] SPIN-STABILIZED ROCKET PROJECTILE
[75] Inventor: Abraham Makow, Ramat Gan, Israel
[73] Assignee: Werkzeugmaschinenfabrik Oerlikon-Buhrle, A.G., Zurich, Switzerland
[22] Filed: Feb. 10, 1971
[21] Appl. No.: 114,321

[30] Foreign Application Priority Data
Feb. 27, 1970 Switzerland..........................2897/70

[52] U.S. Cl. ...............244/3.23, 102/34.3, 102/65.2, 89/1.808, 60/201
[51] Int. Cl. .........................F42b 13/24, F42b 11/04
[58] Field of Search..................102/34.3, 49.7, 65.2; 89/1.808; 244/3.23; 60/201

[56] References Cited
UNITED STATES PATENTS
3,388,666  6/1968  Walther..........................244/3.23 X
2,623,465  12/1952  Jasse ...................................244/3.23
2,750,887  6/1956  Marcus...................................60/201
3,610,096  10/1971  Bauman et al........................89/1.808

Primary Examiner—Benjamin A. Borchelt
Assistant Examiner—James M. Hanley
Attorney—Wenderoth, Lind & Ponack

[57]  ABSTRACT

A spin-stabilized rocket projectile of the type containing a propellant grain and nozzles for the generation of propulsive thrust and spin, said nozzles being disposed in a common nozzle. Propellant grains are provided for providing thrust for spin. A spin generating nozzle is disposed between each pair of adjacent propulsion nozzles. This arrangement allows rotation to be imparted to the projectile before it leaves its guide to improve stability during flight by allowing spin to be generated separately from forward propulsion.

8 Claims, 4 Drawing Figures

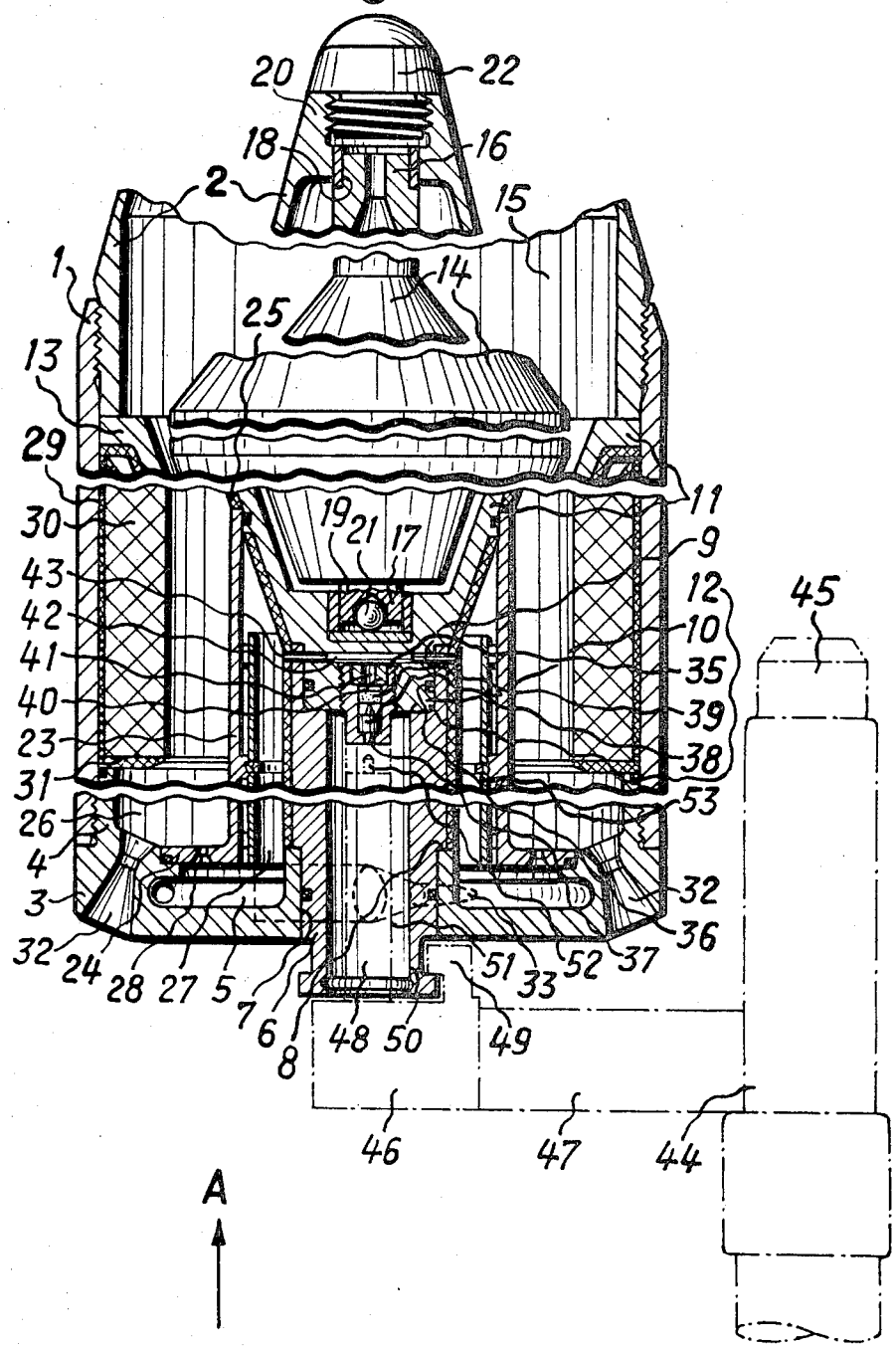

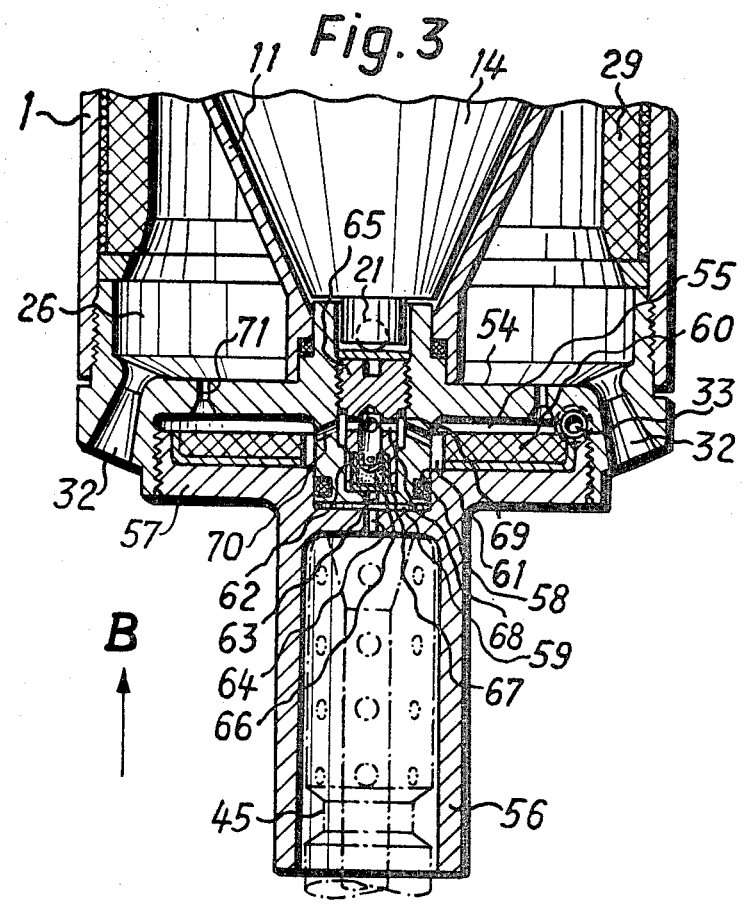
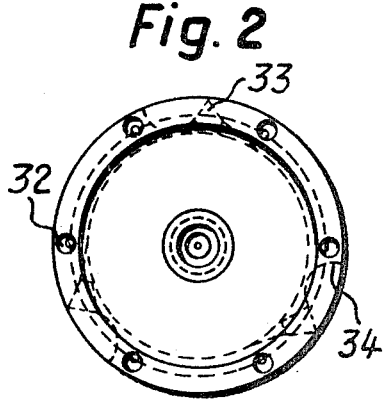
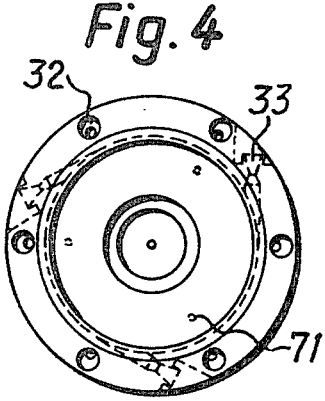

SPIN-STABILIZED ROCKET PROJECTILE

The invention relates to a spin-stabilized rocket projectile of the type containing a propellant grain and nozzles for the generation of propulsive thrust and spin, said nozzles being disposed in a circle in a common nozzle body.

A known spin-stabilized rocket projectile of this type has a plurality of nozzles disposed in a circle, and these are so oriented that the issuing gas jets which are derived from a common propellant grain provide a component of thrust that is axially directed as well as a component of thrust that is tangential to the circle and generates spin. The disposition of the nozzles on a circle in a plane normal to projectile axis permits the rocket to be mounted on a guide rod and propelled from the same. In the known rocket projectile spin cannot be separately generated apart from forward propulsions. It is therefore impossible for instance to impart rotation to the projectile before it leaves the guide rod, although this would be desirable for achieving a substantial improvement of stability during flight.

The object of the present invention is therefore the provision of a spin-stabilized rocket projectile which does not possess the above mentioned defect.

A spin-stabilized rocket projectile according to the invention comprises nozzles for the generation of forward propulsion and nozzles for the generation of spin, said nozzles being disposed in a circle in a common nozzle body, a propellant grain for providing thrust for propulsion, and a further propellant grain for providing thrust for spin, in which a spin generating nozzle is disposed between each pair of adjacent forward propulsion nozzles.

Two embodiments of a spin stabilized rocket projectile according to the invention are illustratively shown in the accompanying drawings in which:

FIG. 1 is a longitudinal section of a first embodiment;
FIG. 2 is a view in the direction of arrow A of FIG. 1;
FIG. 3 is a part longitudinal section of a second embodiment of a projectile according to the invention, and
FIG. 4 is a view in the direction of arrow B of FIG. 3.

With reference to FIG. 1 the projectile comprises a cylindrical shell 1 and a conical cap 2 screwed to one end of the shell. A baseplate 3 having integral therewith a sleeve 4 is screwed to the shell 1. The baseplate 3 is provided with a forwardly open annular recess 5. A bush 6 is contained in a central bore 7 of the baseplate 3 and bears against an abutment 8 thereof. The bush 6 projects into the projectile interior and its forward end has an enlarged bore 9 forming a shoulder 10.

A hollow conical protective steel liner 11 opens in the forward direction and has an extension 12 at its rear end. The extension 12 fits centrally into the bore 9, and rests on the shoulder 10 of the bush 6. A rim 13 of the protective liner 11 bears against the shell 1 and serves as an abutment for the cap 2. A hollow charge 14 (not shown in detail) is contained in a chamber 15 formed between the protective liner 11 and the cap 2 of the projectile. The hollow charge 14 can rotate inside the chamber 15 by means of two cylindrical extensions 16 and 17 which are received into central bores 18, 19 in the head 20 of the cap 2 and in the extension 12 of the liner 11. The hollow charge 14 rests on a ball 21 provided in the bottom of the bore 19. A percussion fuze 22 is situated at the head of the cap 2.

A sleeve 23 is disposed between the bush 6 and the shell 1 concentrically with these two parts. The sleeve 23 is formed with a radially projecting flange 24 which bears on the baseplate 3. One edge 25 of the end of the sleeve 23 bears against the protective liner 11. The sleeve 23 divides the space between the shell 1, the protective liner 11, the bush 6 and the baseplate 3 into two concentric annular compartments 26 and 27. The sleeve 23 contains three holes 28 to provide communication between the two compartments 26, 27. A hollow cylindrical propellant grain 29 is adhered to a heat-insulating lining 30 which covers the inside of the shell. The rear end face of the propellant grain 29 is covered by an annular disc 31 which rests on the upper end of the sleeve 4 of baseplate 3.

The annular compartment 26 forms a combustion chamber and is vented by six nozzles 32 for developing forward propulsion. These are machined into the baseplate 3 at equiangular intervals. The axes of the nozzles 32 define the surface of a theoretical cone having its apex on the projectile axis which axis is coincident with theoretical cone axis. A second hollow cylindrical propellant grain 53 is attached to the inner wall of the sleeve 23. The annular compartment 27, enlarged by the recess 5, forms a second combustion chamber which is provided with three equiangularly disposed spin-generating nozzles 33. The spin-generating nozzles 33 are machined into the baseplate 3 and their axes, as shown in FIG. 2, are tangential to a circle contained in a plane normal to the projectile axis. Thus the baseplate 3 forms a common nozzle body for the spin-generating and the forward thrust nozzles. The spin-generating nozzles 33 open into recesses 34 cut into the outside of the baseplate between each pair of forward propulsion nozzles 32.

A bush 35 is screwed into a blind hole 36 in the center of the end of the extension 12 of the protective liner 11. The bottom of the bush 35 contains a bore 37 in which is slidably mounted a firing pin 38 the point of which touches a detonator cap 39. The detonator cap 39 bears against a disc 40 which is screwed into the bush 35 from the front end, and which has a central hole 41. A bore 42 in the extension 12 of the protective liner 11 extends in a plane normal to the projectile axis and leads into the coned bottom of the hole 36. The bush 6 contains two channels 43 that are coaxial with the bore 42. The outsides of the protective liner 11 and of the bush 6 are coated with layers of a heat-insulating material.

As is shown from that part of FIG. 1 in dot-dash lines in use a tubular sheath 44 embraces a barrel 45 of a rifle, such as an assault rifle. The casing of an ignition device is secured to a bracket 47 attached to the sheath 44. The bush 6 of the projectile is slidably mounted on a tubular guide 48 connected to the casing 46. A catch 49 is rotatably fitted to the case 46 in a manner not shown in detail. This catch 49 engages an annular slot 50 in the rear end of the bush 6 and thus holds the projectile. A firing pin 51 with a pointed end 52 is movable mounted inside the tubular guide 48. Its pointed end 52 is directly to the rear of the bottom end of the bush 35.

The manner in which the projectile functions is as follows:

When a trigger mechanism (not shown) is operated the striker pin 51 is propelled forwards and at the same time the catch 49 is turned out of engagement with the slot 50 in the bush. The point 52 of the striker pin 51 enters the bore 37 in the bush 35 and hits the firing pin 38 which pierces the detonator 39. The flame jet from the detonator 39 passes through the hole 41 in the disc 40, the bore 42 in the extension 12 and the channels 43 into the combustion chamber 27 where it lignites the propellant grain 53. The gases evolved by the burning propellant grain 53 escape through the spin-generating nozzles 33. The projectile thus experiences tangentially acting thrusts which cause it to rotate about its longitudinal axis whilst it remains on the tubular guide 48 before being propelled in the axial direction. Meanwhile, gas also passes through the holes 28 and enters the other combustion chamber 26. Only as much gas reaches this latter chamber as is necessary to ignite the propellant grain 29 shortly before burn-out of the propellant grain 53. The gases evolved by the propellant grain 53 thus provide the energy required for igniting the propellant grain 29.

The component of thrust acting in the axial direction, generated by the gases issuing from the propulsion nozzles 32, now accelerates the projectile. Upon leaving the tubular guide 48 its forward speed is still low, but its speed of rotation is already high enough for stabilization. The gases evolved by the propellant grain 29 pass through the holes 28 and in their turn enter the first combustion chamber 27 whence they escape through the spin-generating nozzles 33 and consequently continue to impart spin to the projectile for as long as it is accelerated in the axial direction. The hollow charge 14 does not participate in the rotation of the projectile and merely rotates slowly inside the projectile at a speed depending upon the magnitude of the frictional forces that are created around the circumference of the two cylindrical extensions 16 and 17 which form bearings.

In the embodiment shown in FIG. 3 a baseplate 54 of the projectile contains an annular recess 55 machined into its rear face. A cylindrical socket 56 is formed with a coverplate 57 extending perpendicularly to the projectile axis. The coverplate 57 contains a blind bore 58, in which is arranged a central cylindrical part 59 of the baseplate 54. The coverplate 57 is screwed into the baseplate 54 and covers the recess 55. A ring-shaped propellant grain 60 is contained in a combustion chamber 61 formed between the baseplate 54 and the coverplate 57, and adhesively affixed to the coverplate 57.

The part 59 of the baseplate 54 has a forwardly open cylindrical recess 62 which communicates with a central igniting hole 63. The igniting hole 63 is coaxial with an igniting channel 64 connecting the interior of the socket 56 to the recess 58 in the coverplate 57. The recess 62 contains an ignition plug 65 supported on the bottom of the recess. A detonator cap 66 is inserted into a blind bore 67 drilled into the rear end of the ignition plug 65. Two passages 68 extending perpendicularly from the bore 67 lead into an annular chamber 69 contained between the wall of the recess 62 and the ignition plug 65. This annular chamber 69 communicates through two passages 70 with the combustion chamber 61 in which forces for spinning the projectile are generated. Three holes 71 in the baseplate 54 provide communication between the combustion chamber 61 and the combustion chamber 26 in which forces for creating a forward propulsion of the projectile are created. The ball 21 upon which the hollow charge 14 stands, rests on the end face of the ignition plug 65. The protective liner 11 is centered on the baseplate 54 which supports it. As in the projectile shown in FIGS. 1 and 2 the axes of the six main propulsion nozzles 32 in the baseplate define the surface of a common theoretical cone enveloping the combustion chamber 61. Moreover, between each pair of neighboring propulsion nozzles 32 one of a total of three spin-generating nozzles 33 associated with the combustion chamber 61 is machined into the baseplate 54. Thus the baseplate 54 forms a common nozzle body for both the spin-generating and the forward thrust nozzles. The socket 56 fits over the muzzle end of a rifle barrel 45.

The difference between the manner the projectile according to FIGS. 3 and 4 functions and that described with reference to FIGS. 1 and 2 is that the propellant grain 60 of the spin-generating combustion chamber is initiated by a pyrotechnical charge fixed in the barrel 45 of the rifle. The pressure of the gases evolved by this charge, which are propagated through the bores 64, 63, ignites the detonator charge 66 and this in turn ignites the propellant grain 60 by means of its jet which travels through the channels 68, 69 and 70. The combustion gases of this propellant grain 60 then flow through the holes 71 into the combustion chamber 26 and also ignite the propellant grain 29 of the propulsion chamber.

What I claim is:

1. A spin-stabilized rocket projectile comprising a nozzle body, nozzles for the generation of forward propulsion disposed in a circle in said nozzle body, nozzles for the generating of spin disposed in a circle in said nozzle body, a propellant grain for providing thrust for propulsion, and a further propellant grain for providing thrust for spin, in which each spin generating nozzle is disposed between two propulsion nozzles.

2. A spin-stabilized rocket projectile as claimed in claim 1 in which the nozzle body is a baseplate screwed into the rear end of the rocket projectile.

3. A spin-stabilized rocket projectile comprising a nozzle body formed by a baseplate screwed into the rear end of the rocket projectile, nozzles for the generation of forward propulsion disposed in a circle in said nozzle body, nozzles for the generation of spin disposed in a circle in said nozzle body, a propellant grain for providing thrust for propulsion, a further propellant grain for providing thrust for spin, and concentrically disposed combustion chambers in which are located the entry opening into the propulsion nozzles and the spin generating nozzles, in which each spin generating nozzle is disposed between two propulsion nozzles.

4. A spin-stabilized rocket projectile as claimed in claim 3 in which the entry openings into the forward propulsion nozzles and into the spin-generating nozzles are located on circles of different diameters.

5. A spin-stabilized rocket projectile comprising a nozzle body formed by a baseplate screwed into the rear end of the rocket projectile, nozzles for the generation of forward propulsion disposed in a circle in said nozzle body, nozzles for the generation of spin disposed in a circle in said nozzle body, a propellant grain for providing thrust for propulsion, a further propellant grain for providing thrust for spin, and a combusion chamber containing one of the propellant grains enclosed within said baseplate, in which each spin generating nozzle is disposed between two propulsion nozzles.

6. A spin-stabilized rocket projectile as claimed in claim 5 including a cover plate screwed to the baseplate and in which the space between the cover plate and the baseplate contains the propellant grain.

7. A spin-stabilized rocket projectile as claimed in claim 6 in which the spin generating nozzles communicate with the combustion chamber that is enclosed within the baseplate.

8. A spin-stabilized rocket projectile comprising a nozzle body formed by a baseplate screwed into the rear end of the rocket projectile, nozzles for the generatorion of forward propulsion disposed in a circle in said nozzle body, nozzles for the generation of spin disposed in a circle in said nozzle body, a propellant grain for providing thrust for propulsion, a further propellant grain for providing thrust for spin, and concentrically disposed combustion chambers communicating through openings in which are located the entry opening into the propulsion nozzles and the spin generating nozzles, in which each spin generating nozzle is disposed between two propulsion nozzles.

* * * * *